United States Patent [19]

Oas

[11] 4,140,481
[45] Feb. 20, 1979

[54] OVEN WITH IMPROVED PARISON ROTATING MEANS

[75] Inventor: David C. Oas, Lenox, Mass.
[73] Assignee: Beloit Corporation, Beloit, Wis.
[21] Appl. No.: 851,863
[22] Filed: Nov. 16, 1977
[51] Int. Cl.² .............................................. F27B 9/14
[52] U.S. Cl. ...................................... 432/124; 34/105; 74/411; 74/461
[58] Field of Search .................. 432/124; 74/411, 461; 34/105; 65/227, 268

[56] References Cited

U.S. PATENT DOCUMENTS

| 440,378 | 11/1890 | Stanley | 74/461 |
| 1,123,747 | 1/1915 | Hughes | 74/461 |
| 3,149,373 | 9/1964 | Marzillier | 18/5 |
| 3,740,868 | 6/1973 | Moore et al. | 432/124 X |
| 3,947,243 | 3/1976 | Sokolow | 432/124 |

Primary Examiner—John J. Camby
Attorney, Agent, or Firm—Dirk J. Veneman; Michael L. Gill; Gerald A. Mathews

[57] ABSTRACT

A tubular parison heating oven having a conveyor passing therethrough with parison holders rotatably mounted thereon for supporting the parisons in a vertical position. A toothed wheel is fixed to each parison holder for rotation therewith and a multiplicity of coil springs are vertically oriented and aligned adjacent the path of movement of the conveyor so as to engage the toothed wheel as the conveyor passes through the oven to cause rotation of the parison holders.

2 Claims, 4 Drawing Figures

OVEN WITH IMPROVED PARISON ROTATING MEANS

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to ovens for preheating tubular parisons or the like in preparation for a blow molding operation and in particular to a means for improving the uniform application of heat to the parisons.

One method of making blow molded articles involves the extrusion of a plastic material in the form of a tube. The tube is severed into discrete lengths called parisons and cooled. The individual parisons are then reheated to a predetermined temperature, one end is pinched off and the parison is blown to the final article shape in a mold.

Depending upon the article being made and the material of which it is to be made, the reheat process can be quite critical and difficult. For example, a method of making blown articles from polypropylene is described in considerable detail in commonly owned U.S. Pat. 3,765,813. That patent describes an endless conveyor which passes through an oven. Rotatable support means for carrying parisons in a vertically oriented position are mounted on the conveyor. Toothed wheels are fixed to the support means and engage upstanding pins which are arranged adjacent the path of movement of the conveyor. The engagement of the pins with the toothed wheels causes the parison support means to rotate as they pass through the oven. Examples of such parison rotating mechanisms are described in more detail in U.S. Pat. Nos. 3,149,373 and 3,740,868.

U.S. Pat. No. 3,947,243 recognized the problem that if there is any misalignment between the conveyor and/or toothed wheel and the vertical pins for engaging the wheel, there is the danger of the wheel not rotating or the wheel or pin breaking. In order to avoid such damaging interference between the spoked wheel and the vertical pin or rotating mechanism, the aforesaid U.S. Pat. No. 3,947,243 suggests the use of stiff vertically or horizontally arranged bristles alongside the conveyor to engage the teeth of the wheel.

While this system assures continued rotation of the parison as it passes through the oven and avoids interference or breakage of parts, bending of individual wires forming the bristles causes rotors to rise up out of the bristles and the continued rubbing of a multitude of bristles on the toothed wheel causes wear on the teeth. It is, therefore, desirable to provide a means for rotating the parisons which avoids these problems.

In accordance with the present invention, an oven of the type having an endless conveyor passing therethrough and including rotatable parisons support mechanisms having a toothed wheel is provided with an improved means positioned alongside at least portions of the conveyor for engaging the toothed wheels of the parison holders for turning these wheels about their axis as the parison holders move through the oven. In accordance with the main feature of this invention, the tooth engaging means combines the characteristics of stiffness sufficient to accomplish rotation of the parison holder and the capability of yielding to forces exerted thereon by misalignment between the teeth of the toothed wheel and the tooth engaging means thereby eliminating abrasive engagement between the tooth engaging means and the tooth.

This is accomplished by providing the tooth engaging means in the form of a multiplicity of coil springs vertically arranged along the length of the conveyor in tooth engaging position. The coil springs can bend and distort a certain amount to accommodate any misalignment of the tooth or conveyor yet are ridged enough to pop into the spaces between the teeth and cause rotation of the parison holder. Further, the fact that the relatively smooth individual coil elements which engage the sprocket extend parallel to the line of motion of the sprocket results in elimination of the abrasive engagement between the individual coil elements and the toothed wheel.

It is an object, therefore, of the present invention to provide in an oven for heating tubular parisons an improved means for assuring that the parisons are uniformly heated about their circumferences and through their wall thicknesses.

It is another object of the present invention to provide an improved means of rotating the parisons as they traverse through an oven which will have an extended service life.

It is still another object of the present invention to provide resilient means for engaging toothed wheels for rotating parisons mounted on a conveyor passing through an oven which exhibits reduced wear or abrasion on the toothed wheel.

Other objects will be in part apparent and in part pointed out more in detail hereinafter.

The invention accordingly comprises the features of construction, combination of elements and arrangement of parts which will be exemplified in the construction hereafter set forth and the scope of the application of which will be indicated in the appended claims.

IN THE DRAWINGS

Figure 1:
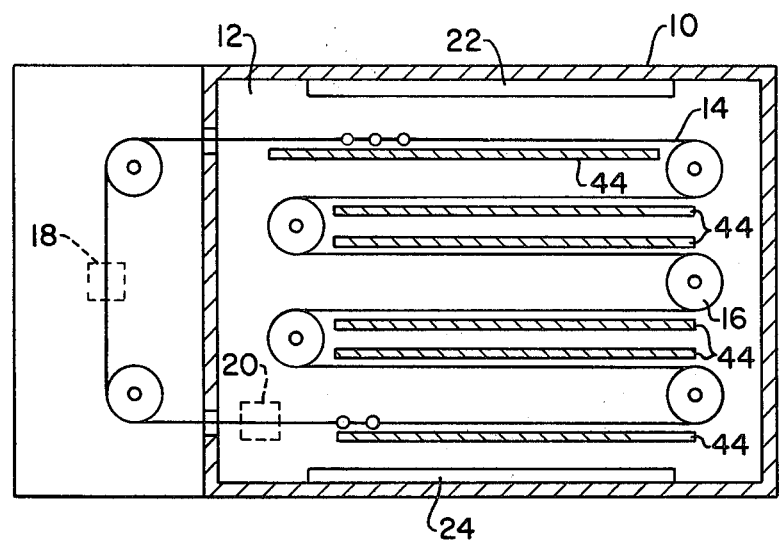
FIG. 1 is a schematic top view of a parison heating oven of a type with which the present invention is concerned.

In FIG. 1 there is illustrated a parison heating oven 10 which comprises a heating chamber 12 and an endless conveyor 14 traversing therethrough in a zigzag pattern passing about sprockets 16. A loading station 18 is provided outside the oven for receiving parisons to be transported through the oven on the conveyor 14. Heated parisons are removed from the conveyor 14 at unloading station 20 for movement to the blow molding section (not shown) of the apparatus.

Hot air is directed into the heating chamber 12 through a plenum 22 located in one side of the chamber and exhausts through plenum 24 located in the opposite side of the chamber. Thus it can be seen that the heating air passes across the chamber 12 and in order to provide uniform heating about the circumference and through the thickness of the parisons, it is desirable that the parisons rotate throughout their passage through the chamber 12.

Since the heating oven and chamber do not comprise the novel aspects of the present invention, further details thereof are not necessary in order to understand the present invention and are, therefore, not included herein. For complete details of a typical parison heating oven, reference can be had to the aforementioned U.S. Pat. No. 3,765,813 which is incorporated herein by reference.

Figure 2:
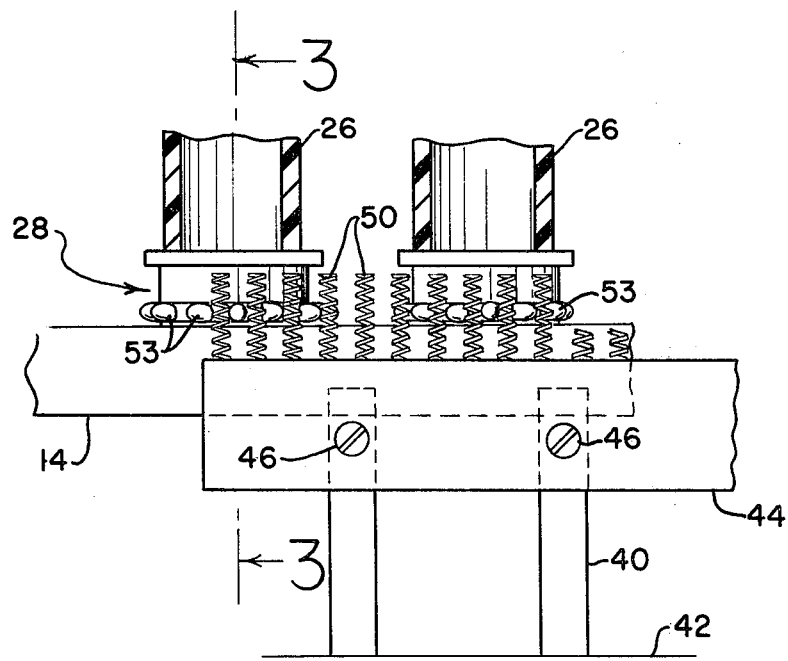
FIG. 2 is an enlarged partial sectional view of the oven of FIG. 1.
Figure 3:
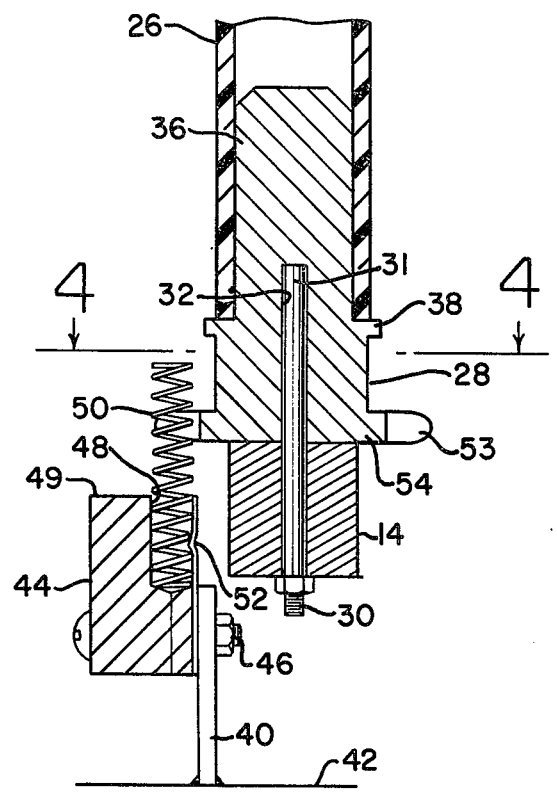
FIG. 3 is a sectional view of the parison rotating means taken substantially along line 3—3 of FIG. 2.
Figure 4:
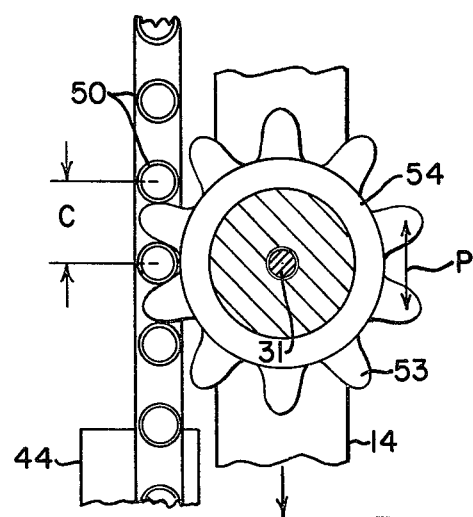
FIG. 4 is a sectional view of the parison rotating means illustrated in FIG. 3 taken substantially along line 4—4 of FIG. 3.

With reference to FIGS. 2 and 3, parisons preforms 26 rest on parison support means generally illustrated at 28, which is rotatably supported on the conveyor 14 which may be of any desirable construction, such as a roller chain. A vertically oriented rod 30 extends through and is supported on the conveyor 14 with its upper end 31 extending into a coaxial bore 32 in the parison support means 28.

The carrier or parison support means 28 includes a vertically extending rotor 36 which has a diameter slightly less than the inside diameter of the parison 26 and terminates at its lower end in an annular shoulder 38. The parison 26 thus is receivable over the rotor 36 and rests on the shoulder 38 for transportation through the chamber 12. A toothed wheel or sprocket 54 is provided on the lower end of the parison support means 28 with its axis of rotation coincident with the axis of the rod 30. Rotation of the toothed wheel will thus cause rotation of the parison 26.

Referring specifically to FIGS. 2 and 3, a plurality of upstanding bars 40 are rigidly fixed to the floor 42 of the oven 10 by any suitable means. The bars 40 are positioned and aligned adjacent the path of movement of the conveyor 14 so as to carry elongated support means 44 at their upper ends in predetermined aligned position adjacent straight runs of the path of motion of the carriers or parison holding devices 28. The elongated support means 44 are secured to the bars 40 by any suitable means, such as bolt and nut arrangement 46.

A multiplicity of aligned vertically extending holes 48 are provided along the upper side 49 of the support means 44 for receiving tooth engaging means 50. In the particular embodiment illustrated and in accordance with the present invention, the tooth engaging means 50 comprises a coil spring having its helix axis extending vertically and parallel to the axis of the parisons as they move through the oven. The distance C between centers of the coil spring 50 is equal to or corresponds to the pitch P of the toothed wheel 54.

In the particular embodiment illustrated, tooth engaging means or coil spring means 50 are retained within the hole by a detent 52 conveniently provided with a punch after the spring 52 has been inserted into the hole 48. If the spring 50 at sometime needs replacing, it can be removed by unscrewing the coil spring 50 from the hole 48 and screwing another one in the hole in the same fashion as a threaded bolt. The spring 50 is thus securely held within the hole 48 in its proper aligned position adjacent the path of the carriers 28.

In the movement of the parisons through the oven, the toothed wheel 54 will engage the spring means 50. If there is misalignment of the tooth relative to the pitch of the evenly spaced springs 50, the springs 50 will deflect somewhat, but also rotate the toothed wheel 54 into proper meshing relationship with the rest of the springs down the row.

It will be appreciated that since the coil springs will present a smooth rounded surface to the confronting faces of the teeth 53 on the toothed wheel 54, there will be a smooth sliding or rolling action between the coil spring and the tooth 54 thus avoiding abrasive contact between the tooth engaging means 50 and the teeth 53 which would otherwise tend to prematurely wear out the sprocket.

While certain representative embodiments and details have been shown for the purpose of illustrating the invention, it will be apparent to those skilled in the art that various changes and modifications may be made therein without departing from the spirit or scope of the invention.

What is claimed is:

1. An oven for heating tubular parisons or preforms comprising an oven housing, means for heating the interior of the oven housing, a transport means for transporting the parisons or preforms along a path through the oven housing, turning means for turning the tubular parisons or preforms about their axes as they travel through the oven housing, said turning means including a toothed rotatable member operatively associated with each parison or preform such that its respective parison or preform rotates therewith, and a group of coil springs positioned alongside at least a portion of said path through the oven, said springs being oriented with their helix axes parallel to the long axes of said parisons or preforms and disposed close enough to the path to engage the teeth of said toothed rotatable member to cause rotation of the toothed rotatable member and hence rotation of the parisons or preforms about their axes.

2. An oven as claimed in claim 1 wherein the centerline spacing of the coil springs alongside the path equals the pitch of the teeth on the tooth wheel.

* * * * *